May 4, 1948.　　　　　F. H. BOGART　　　　　2,440,926
MACHINE TOOL
Filed Jan. 11, 1945　　　　　4 Sheets-Sheet 1
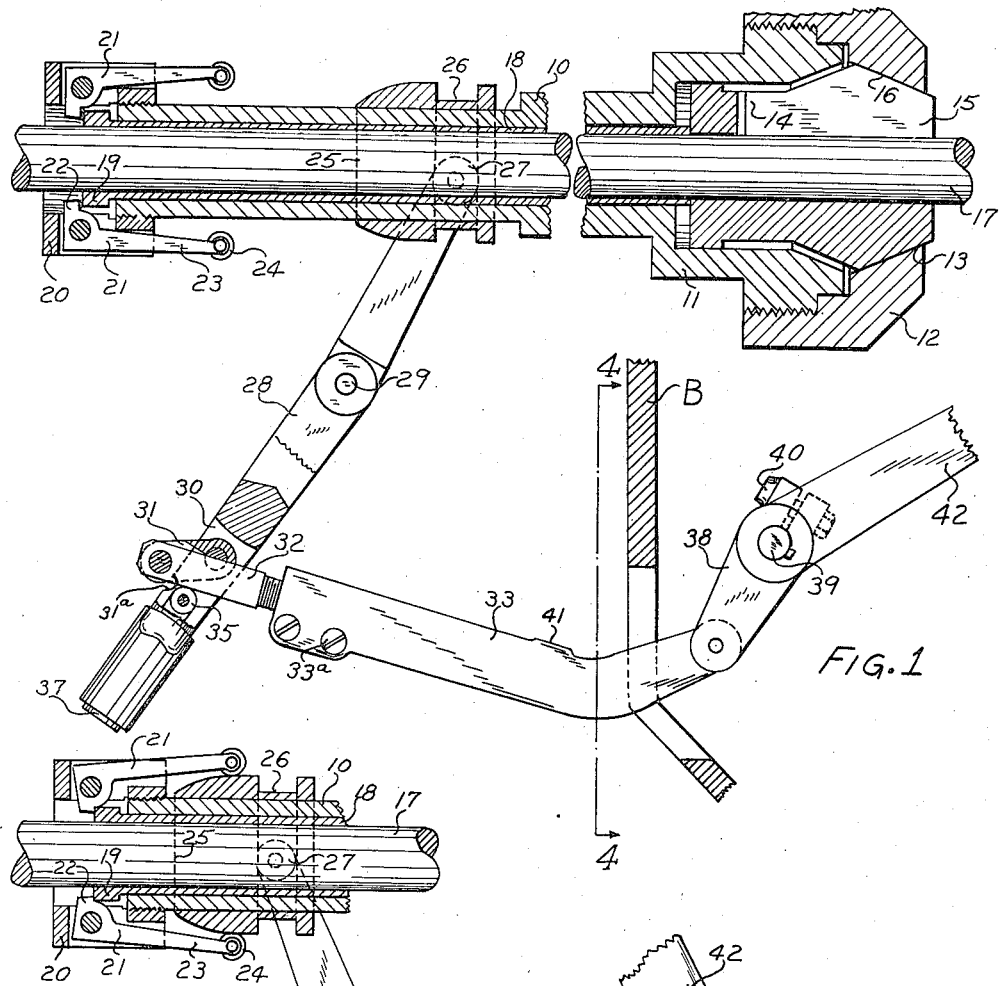
Fig. 1
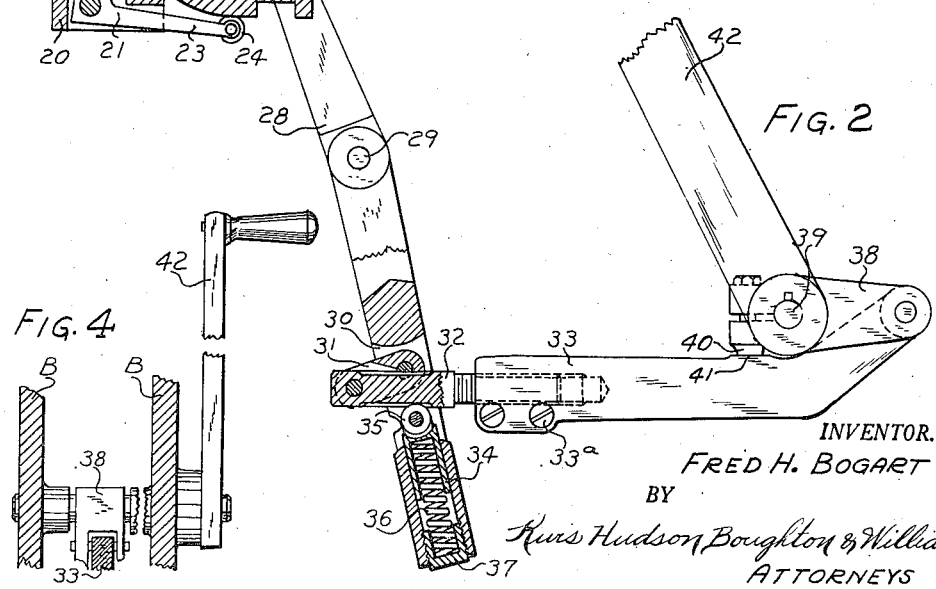
Fig. 2
Fig. 4
INVENTOR.
FRED H. BOGART
BY
Kwis Hudson Boughton & Williams
ATTORNEYS

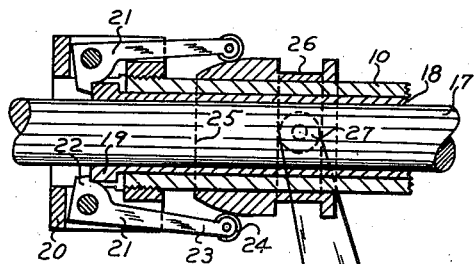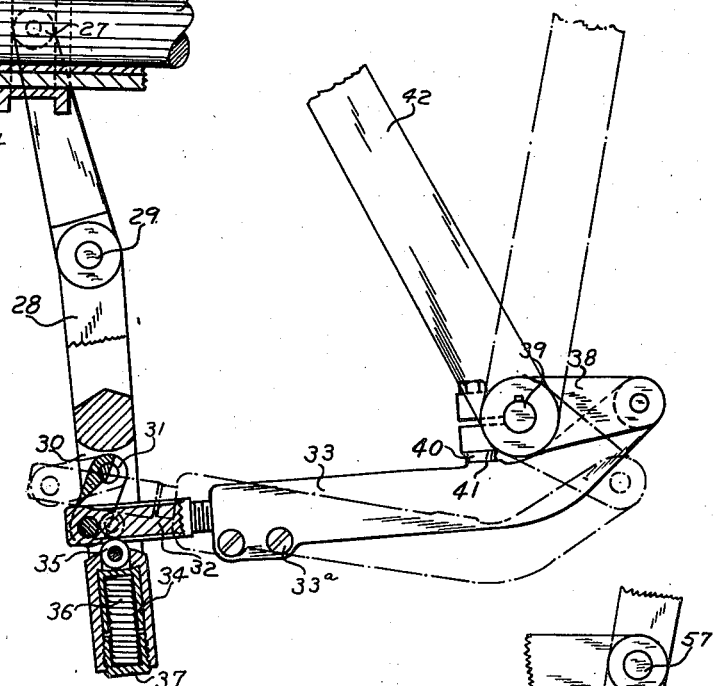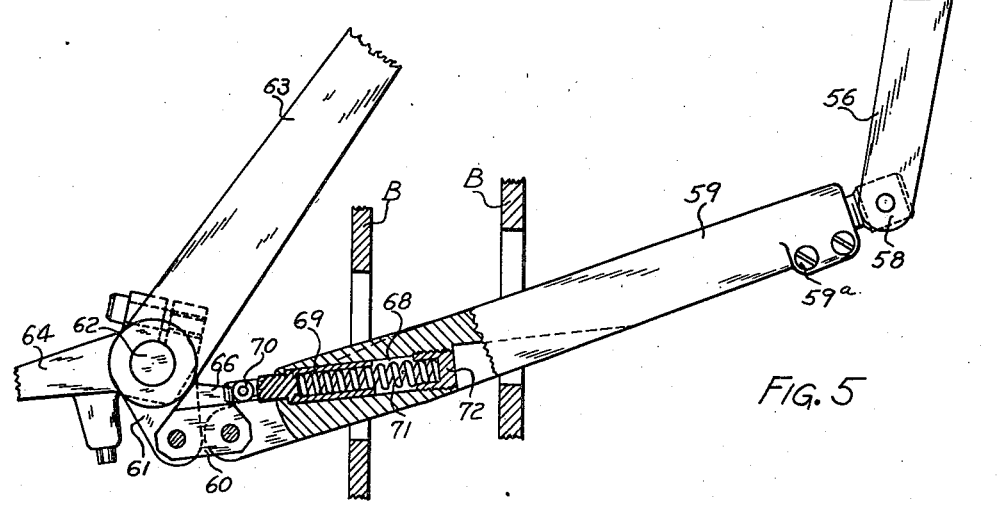

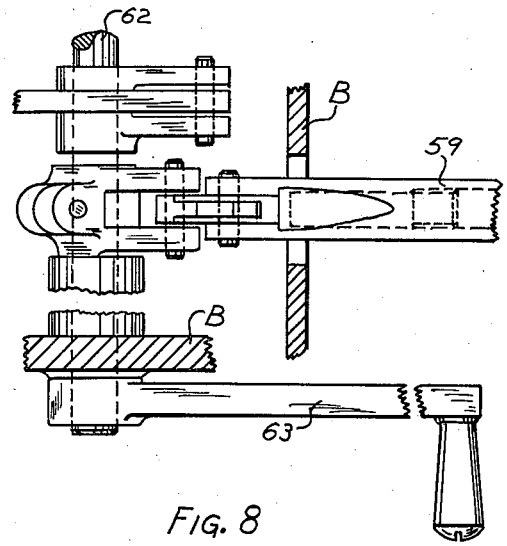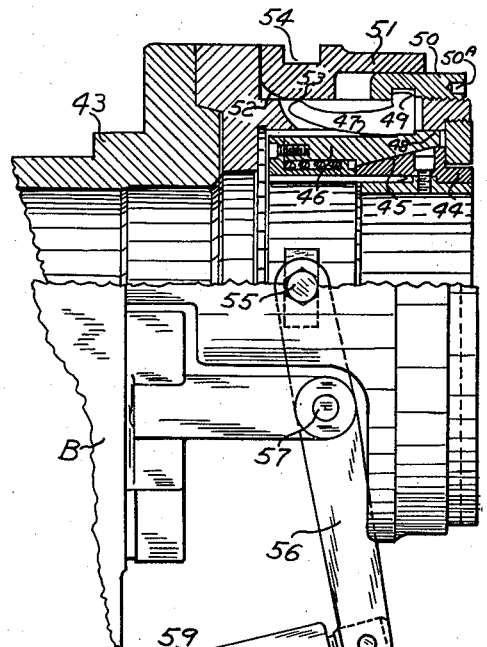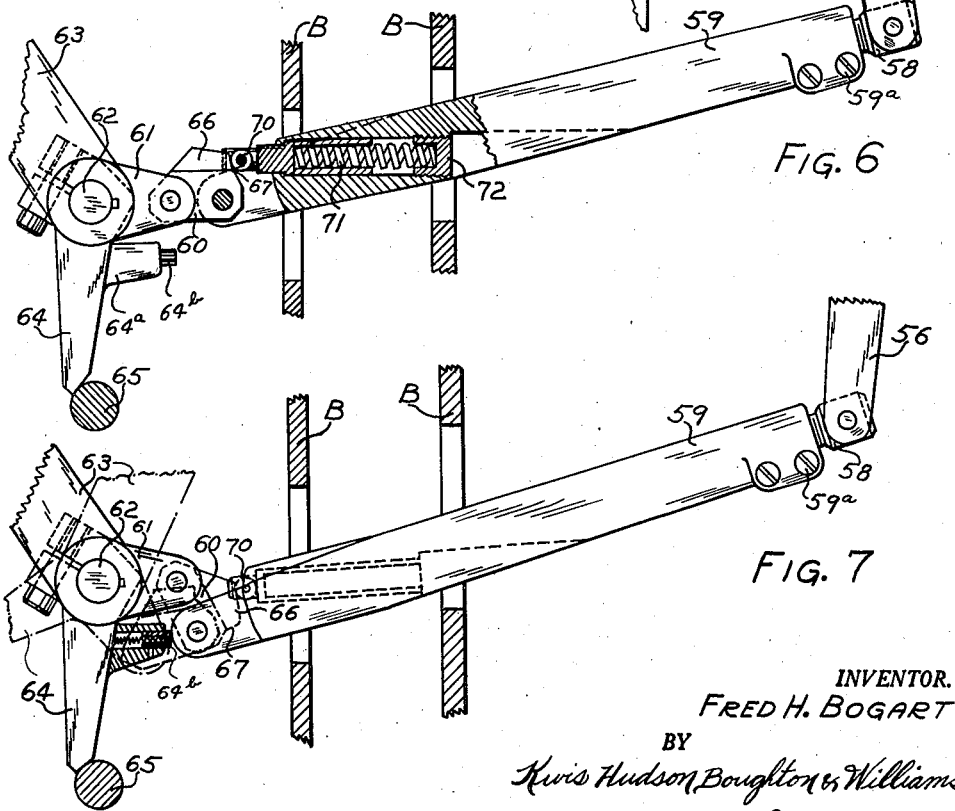

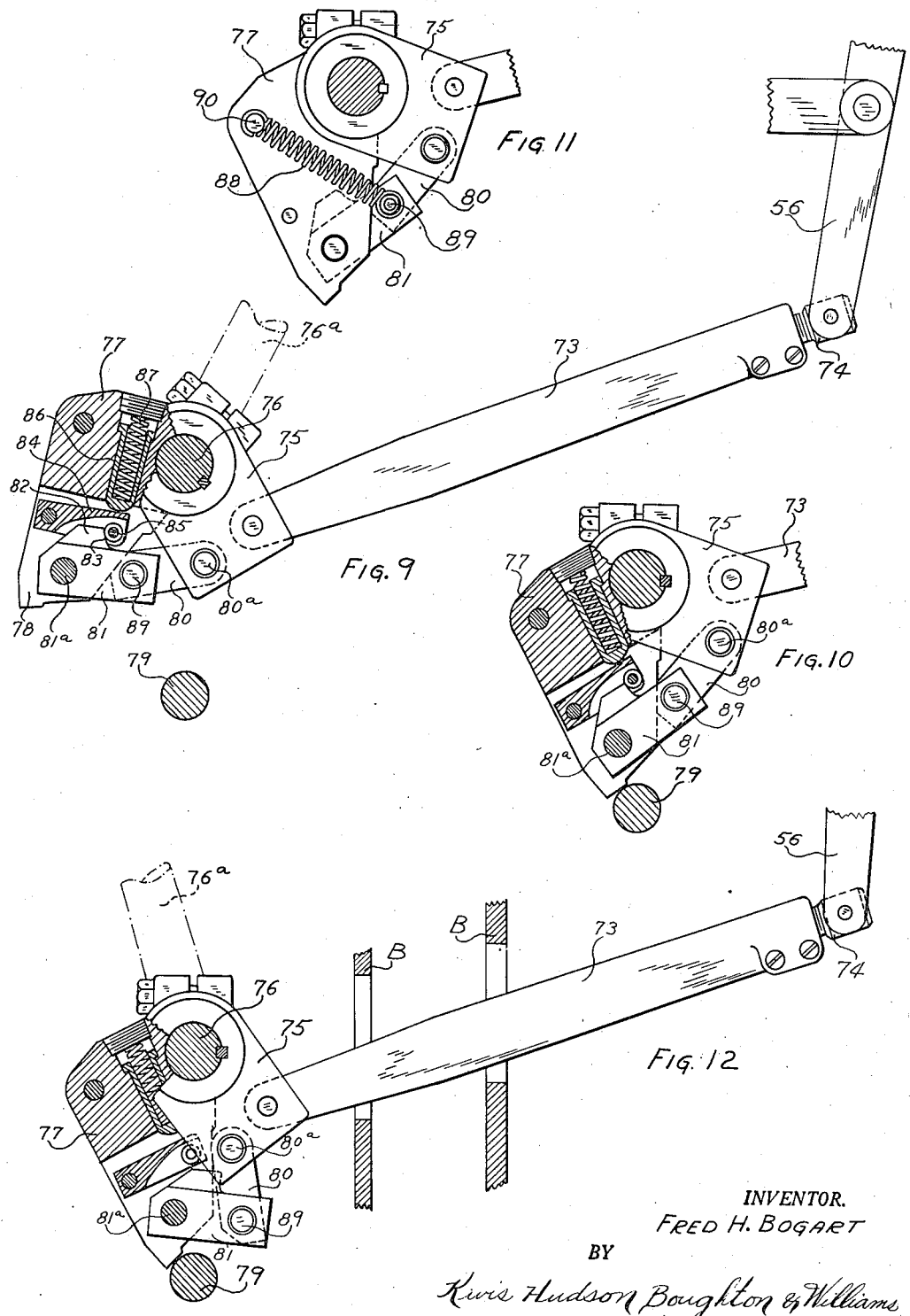

Patented May 4, 1948

2,440,926

UNITED STATES PATENT OFFICE 2,440,926

MACHINE TOOL

Fred H. Bogart, South Euclid, Ohio, assignor to The Warner & Swasey Company, Cleveland, Ohio, a corporation of Ohio Application January 11, 1945, Serial No. 572,374

25 Claims. (Cl. 279—1)

This invention relates to a machine tool and more particularly to the collet chuck operating mechanism of a bar working machine tool.

In the operation of bar working machine tools the operator adjusts the chuck actuating mechanism in accordance with the diameter of the bar of stock to be gripped by the chuck. In the event that the operator, after having adjusted the chuck actuating mechanism for a certain diameter of stock, should insert a bar of stock of larger diameter in the chuck the various parts of the chuck actuating mechanism will not move to fully closed or stock gripping position, and if forced in an effort to bring such parts fully into such position, there is the likelihood of damage or breakage to certain of the parts. In the case of a manually operated chuck actuating mechanism the operator can tell by the feel or the resistance to the movement of the operating handle whether or not the various parts of the actuating mechanism are in full chuck closed or stock gripping position. Also it would be most exceptional if the operator possessed sufficient strength to force the parts to an extent which would damage or break the same. However, where the chuck actuating mechanism includes a power arrangement for closing the chuck as, for example, an arrangement such as is shown in my copending application Serial No. 548,829, filed August 10, 1944, there is the danger that the various parts of the chuck actuating mechanism might be damaged or broken since the power force applied to the actuating mechanism would be sufficient to effect this bad result and furthermore the operator would be unable to tell by the feel of the operating handle or from observation that the various parts of the actuating mechanism are not in fully closed or work gripping position.

An object of the invention is to provide in a machine tool a collet chuck actuating mechanism which eliminates the above mentioned danger of damaging, bending or breaking the parts of the mechanism should excessive force be applied thereto to bring the same into fully closed or work gripping position when an oversized bar of stock has been inserted in the collet chuck.

Another object is to provide in a machine tool a chuck actuating mechanism such as specified in the last named object, and wherein provision is made for visually indicating to the operator that the various parts of the actuating mechanism are not in complete or work gripping position.

Further and additional objects and advantages not expressly referred to will become apparent hereinafter during the detailed description of several embodiments of the invention which is to follow.

Referring to the accompanying drawings,

Fig. 1 is a somewhat diagrammatic longitudinal sectional view through a portion of the work spindle and collet chuck of a machine tool, with the actuating mechanism for said chuck shown partly in elevation and partly in section, the parts of the actuating mechanism being shown in the relative positions they occupy when the collet chuck is fully opened.

Fig. 2 is a view similar to Fig. 1 and shows the relative positions of the parts of the chuck actuating mechanism when the chuck is fully gripping a length of stock of the diameter for which the actuating mechanism has been adjusted.

Fig. 3 is a view similar to Figs. 1 and 2, and shows in full lines the relative positions assumed by the parts of the chuck actuating mechanism when an attempt has been made to move such parts into fully closed or work gripping position upon a length of stock of too large a diameter, certain of the parts being shown by dot and dash lines in the position to which they are automatically returned by spring means under such conditions and after the actuating force has terminated.

Fig. 4 is a fragmentary sectional view through a portion of the bed of the machine tool, taken on line 4—4 of Fig. 1, and shows the operating handle or member at the front of the bed.

Figs. 5, 6 and 7 are similar to Figs. 1 to 3 inclusive, respectively, but showing a somewhat different form of chuck actuating mechanism for a different type of collet chuck.

Fig. 8 is a fragmentary view partly in section and partly in top plan, of the elements shown in Figs. 5 to 7 inclusive, with the operating handle shown displaced from the normal relationship it should have.

Figs. 9 and 10 are views similar to Figs. 5 and 6 but showing still another form of chuck actuating mechanism.

Fig. 11 is a view similar to Fig. 10 but showing this portion of the mechanism in elevation, and Fig. 12 is a view similar to Fg. 9 but showing the modified actuating mechanism in the collapsed condition.

Referring to Fig. 1, 10 represents the work spindle of a bar working machine such as a lathe. It will be understood that the work spindle is rotatably mounted in the headstock of the machine tool and is driven at different speeds through a suitable change speed transmission, not shown, as it is well understood in the art. The end of the work spindle which is adjacent to the cutting tools, i. e., the right hand end as viewed in the drawing, is provided with an enlarged nose portion 11 which has an externally threaded flange onto which a hood 12 is secured. The hood 12 is provided internally with a conical camming surface 13 concentric with the central opening of the hood and with the bore of the spindle and which serves a purpose shortly to be described. A collet 14 is arranged within the nose 11 and is provided with a plurality of spring gripping jaws 15 with said jaws having external conical camming surfaces 16 that cooperate with the camming surface 13 of the hood 12. The collet 14 is slidable axially of the spindle and when forced toward the right, as viewed in the drawing, the conical surface 13 of the hood acting on the conical surfaces 16 of the spring jaws cam said jaws inwardly into work gripping engagement with the length of bar stock 17 which projects through the spindle and collet. As soon as the pressure against the collet is released, the inherent spring action of the jaws acting through the cooperating cam surfaces causes the collet bodily to shift toward the left with the result that the grip of the jaws on the bar of stock is released.

In order to shift the collet into work gripping position an actuating sleeve 18 is slidably mounted in the bore of the spindle. The right hand end of the sleeve 18, as viewed in the drawing, abuts the collet 14, while the opposite end of the sleeve 18 is provided with an annular shoulder 19 located beyond the end of the spindle and extending into a finger housing 20 which is adjustably screwed onto the adjacent end of the spindle, wherefore the housing can be adjusted axially of the spindle and locked in adjusted position by means not shown as it is well known in the art. The housing 24 rockably mounts levers 21 which, in their entirety, will hereafter be designated as fingers. These levers include heel portions 22 engaging the shoulder 19 of the actuating sleeve and finger portions 23 projecting exteriorly of the housing 20 and carrying at their free ends rollers 24. A cone 25 is slidable on the spindle 10 and said cone on its periphery is provided with a conical camming portion and a cylindrical land portion. The cone is provided with an annular groove 26 which receives the shoes 27 carried by the forked upper end of an actuated lever or part 28 that is pivotally supported at 29 on the bed of the machine tool.

It will be seen that when the cone 25 is moved axially of the spindle toward the left, as viewed in the drawing, the conical camming periphery of the cone will be brought into engagement with the rollers 24 and will spread the fingers, causing the heel portions 22 thereof to press against the shoulder 19 of the actuating sleeve 18 and thus force the sleeve and collet toward the right to cam the collet jaws 15 into gripping engagement with the stock. The construction thus far described is well known in the art and for the present its mode of operation need not be further explained.

The actuated lever 28 below its fulcrum 29 is provided with a longitudinal slot 30, which communicates at its lower end with a longitudinal bore formed in the end of the lever 28 and later to be referred to. A U-shaped link 31 is pivotally connected to the lever 28 in the slot 30 and the free end of said link straddles and is pivotally connected to one end of a part 32 of a two part link which extends through an opening in the bed B, the other part of which is indicated at 33. The lever 28 is provided at the slot 30 with notches 31a, into which the ends of the pin which pivotally connect the U-shaped link 31 with the part 32 engage as shown in Fig. 3, and such engagement limits the counterclockwise movement of the link 31. The part 32 has a threaded end which can be screwed into a threaded bore formed in the longitudinally split end of the part 33, wherefore the two parts can be adjustably interconnected and locked in adjusted position by locking screws 33a.

The longitudinal bore in the lower end of the lever 28 slidably mounts a hollow plunger 34 which is provided at its upper end with a roller 35. A coil spring 36 is located in the bore and extends into the plunger 34, and abuts at its lower end a plug 37 screwed into a threaded lower end of said bore. The spring 36 holds the roller 35 in engagement with the lower side of the part 32 of the two-part link, and the upper side of the part 32 in contact with the cross portion of the U-shaped link 31 as shown in Fig. 1. The spring 36 should be of sufficient strength to move the two-part link and the operating handle later to be referred to from the full line position back to the dash-dot line position of Fig. 3 when it is attempted to close the chuck on a bar of stock of greater diameter than the chuck is adjusted to accommodate, all as will be more fully explained hereinafter.

The right hand end of the part 33 of the adjustable two-part link is angularly bent upwardly and is pivotally connected to the free forked end of an operating arm or part 38 that is fixedly connected to a shaft 39 rockably mounted in suitable supports in the bed B of the machine and extending to the front side thereof, as will be well understood in the art and as is clearly shown in Fig. 4. The arm 38 is provided with a portion 40 arranged to abut a lug 41 on the upper side of the part 33 of the two-part link when the parts of the chuck actuating mechanism have been moved to work gripping position as illustrated in Figs. 2 and 3.

As already stated, the shaft 39 extends beyond the front of the bed and the extended end of said shaft has fixed thereto an operating handle or member 42 by means of which the operator can rock the shaft 39 and where a power means is provided for operating the chuck actuating mechanism, such as is shown in my copending application Serial No. 548,829, the rocking of the shaft 39 will function automatically to initiate the power drive. In my said copending application the operating shaft such as the shaft 39, is rocked not only by means of the operating handle 42, but also is rocked by power means controlled by said handle. This power means may be suitably positioned relative to the shaft 39 and operatively connected thereto, but such arrangement has not been illustrated herein as it is fully disclosed in my said copending application. In such an arrangement the first portion of the manual movement imparted to the operating handle starts the idle movement of the chuck actuating mechanism while the power means subsequently comes into action and continues until the chuck is closed. Consequently, unless the mechanism embodies the instant invention, the operator cannot tell by the feel of the resistance to the movement of the operating lever whether or not the parts of the chuck actuating mechanism have been moved to full work gripping position. Also in such an arrangement where a bar of stock of too great a diameter has been placed in the chuck the power means will continue to exert force against the parts of the actuating mechanism, even though the jaws and the parts cannot move to full work gripping position with the likelihood of damaging, bending or breaking some of the parts, particularly the fingers 21. However, where the chuck actuating mechanism embodies the present invention such danger is obviated.

It will be assumed that the operator has selected a length of bar stock of the desired diameter and has inserted said stock through the spindle and the sleeve 18 and into the collet chuck to the correct position for the machining operation. It will be further assumed that the operator has unlocked the finger housing 20 and unscrewed the same a number of turns. The operator then causes the parts of the chuck actuating mechanism to move to work gripping position as indicated in Fig. 2. He then screws the finger housing onto the spindle until the jaws of the chuck properly grip the stock, and at such time the rollers 24 are positioned on the land of the wedge or cone 25 and the fingers 21 have been spread the correct amount. When this has been done, the operator locks the finger housing 20 in adjusted position. The adjustment referred to having been made it will be understood that when the operating lever 42 is rocked toward the right, as viewed in the drawing, the cone 25 will be moved toward the right and into the position shown in Fig. 1, at which time the rollers 24 are out of contact with the periphery of the cone and the jaws of the collet have released their grip on the stock. When the operating lever 42 is rocked again toward the left, the cone 25 is moved toward the left until the rollers 24 ride up the conical portion of the cone and engage the cylindrical land, and at such time the fingers have been spread apart and the actuating sleeve 18 and collet moved toward the right to cause the collet jaws to grip the stock. It should be noted that the movements of the parts of the operating mechanism, as just referred to, occur when a length of stock of the desired diameter is in the chuck. During such movements no relative movement takes place between the part 32 of the two-part link, the link 31 and the lever 28 since the spring 36 holds said parts in the relationship shown in Figs. 1 and 2.

When the collet is gripping a length of stock of the proper diameter the portion 40 of the arm 38 is in abutting relationship with the lug 41 of the part 33 of the two-part link and at this time the spring 36 is in its normal condition while the operating handle 42 is in the full line position of Figs. 2 and 3.

Assuming that the operator has completed the machining operation on the referred to length of bar stock of the desired diameter and has inserted another length of stock into the spindle and chuck and it happens to be of greater diameter than the desired one, the following condition will occur in actuating the chuck. The operator rocks the operating lever 42 from chuck open position toward work gripping position, which will rock the shaft 39 and also cause the power device to function. A resultant movement of the cone 25 into engagement with the rollers 24 occurs until the cone cannot be moved any farther toward the left because the jaws of the collet are engaging the larger diameter bar of stock. This results in the rollers 24 engaging the conical wedge periphery of the cone near to but not on the circular land for the reason that the sleeve 18 and the collet 14 cannot be shifted to their former right hand work gripping position. However, the power device would continue to exert force on the shaft 39 to force the cone and its actuating lever to their full left hand position, as indicated in Fig. 2, with the result that excessive strain would occur in the parts and particularly in the fingers 21, with a consequent likelihood of damaging, bending or breaking the parts. The arrangement embodying the invention obviates this disadvantage under the conditions referred to. With the present arrangement the continued application of force in the chuck closing direction to the shaft 39 overcomes the strength of the spring 36 and causes the part 32 of the two-part link to move relative to the link 31 from the full line position of Fig. 2 into the full line position of Fig. 3 and to compress the spring 36. During this relative movement between the links the lever 28 is not moved by the force being applied to the shaft 39. The relative movement between the links allows the handle 42 to move into the full line position of Fig. 3 but the operator will be visually warned that the chuck is not in full work gripping condition since as soon as the pressure of his hand is relieved from the handle 42 the spring 36 will move the links and the arm 38 and the handle 42 from the full line position of Fig. 3 to the dot and dash line position thereof, thus partially restoring the handle to chuck open position. It will be evident that the relative movement between the links prevents excessive force being applied to the lever 28, cone 25 and fingers 21, and also results in the handle 42 being returned toward chuck open position. When the invention is applied to a chuck actuating mechanism which includes a power device for operating the shaft 39 in both the chuck closing and chuck opening directions and which device is controlled by the position of the operating handle, it will be understood that the partial return of the operating handle toward chuck open position initiates the operation of the power device to continue this movement of the handle and of the other parts of the actuating mechanism until the chuck is fully opened; in other words, the present invention introduces into the chuck actuating mechanism a safety device which prevents breakage of the parts and which visually indicates to the operator that the chuck is not fully and properly closed.

In Figs. 5, 6 and 7 there is illustrated a different form of collet chuck and a somewhat different arrangement of the chuck actuating mechanism than is shown in Figs. 1 to 3 inclusive. The chuck shown in Fig. 6 is a unitary structure attached to the nose of the spindle and contains no parts mounted in the spindle bore, thus enabling the spindle to accommodate diameters of stock up to the diameter of the spindle bore, and this type of chuck is usually employed in the larger bar working machine tools. The work spindle is indicated at 43 while the chuck mounted in the nose of the spindle includes the jaws 44 which are provided with conical camming surfaces 45. A shiftable member 46 has an internal conical camming surface which cooperates with the camming surface 45 to cause the jaws to move inwardly and grip the bar of stock. The member 46 is shifted in the stock gripping direction by means of fingers 47, which have heel portions 48 contacting an annular shoulder of the shiftable member 46. The fingers 47 float in the chuck and are provided with fulcrum points 49 located in an internal groove in an adjusted ring 50 provided with suitable wrench receiving openings 50a.

The chuck further includes a sleeve 51 which surrounds the chuck body and is slidable axially thereon. The sleeve 51 is provided with a conical camming surface 52 and a cylindrical land surface 53. The sleeve 51 is also provided externally with an annular groove 54. It will be seen that when the sleeve 51 is shifted toward the right as viewed in the drawing the rounded ends of the fingers 47 are permitted to spread outwardly when engaging the camming surface 52 and hence the pressure of the heel portions 48 on the shoulder of the shiftable member 46 is relieved, thus allowing the jaws of the chuck to release their grip on the stock. Conversely, when the sleeve 51 is shifted toward the left from chuck open position the rounded ends of the fingers 47 ride up the camming surface 52 and onto the cylindrical land surface 53, with the result that the fingers are rocked radially inwardly and cause the shiftable member to move toward the right, thus bringing the jaws radially inwardly to grip the stock. The movements of the sleeve 51 just referred to are imparted to the sleeve by means of shoes 55 carried by the forked upper end of an actuated lever or part 56 and which shoes engage in the annular groove 54 of the sleeve 51.

The lever 56 is fulcrumed intermediate its ends at 57 on a bracket fixed to the bed, while the lower end of said lever is pivotally connected to the part 58 of a two-part link which extends through openings in the bed B. The part 58 is provided with a threaded stem which is adjustably screwed into a socket formed in the longitudinally split end of the other part 59 of said two-part link and is locked in adjusted position therein by means of screws 59a. The opposite end of the part 59 is pivotally connected to a plate link 60. The plate link 60 in turn is pivotally connected to the free end of a forked operating arm or part 61, similar in purpose to the operating arm or part 38 of the first mentioned form, and which arm 61 is rigidly connected to the operating shaft 62 which is rockably supported in the bed B of the machine and projects beyond the front wall thereof and has an operating lever 63 keyed to its projecting end similarly as the shaft 39 of the first mentioned form. It will be understood that when a power device is used in conjunction with the shaft 62 and the lever 63 said device will be operatively associated with said shaft and lever in the manner disclosed in my hereinbefore mentioned copending application. The arm 61 has an extended abutment or stop portion 64, the lower end of which engages a fixed stop rod 65 when the parts are in the stock gripping position (see Figs. 5 and 7) and acts to limit the movement of the arm 61 and shaft 62 in the chuck closing direction. The portion 64 is provided with a boss 64a which has a bore formed therein and in which bore is slidably mounted a spring pressed plunger 64b, which plunger is engaged by the plate link 60 when it moves relative to the part 59 of the two-part link from the position shown in Fig. 6 into the full line position of Fig. 7, and said plunger 64b exerts a force tending to restore the relationship of the links as indicated in Fig. 6.

The edge of the plate link 60 is provided with a camming portion 66 and a short camming portion 67 substantially at right angles to the portion 66, and the purpose of which camming portions will later be pointed out.

The part 59 of the two-part link is provided with an angularly positioned bore 68, in which is slidably mounted a hollow plunger 69 that has a forked outer end straddling the plate link 60 and mounting a roller 70, which is in contact with either the camming portion 66 or the camming portion 67 of the plate link, depending upon the conditions of operation of the mechanism. A coil spring 71 is mounted in the bore 68, and one end of said spring extends into the hollow plunger 69 and maintains the plunger normally in bottomed engagement with a shoulder in the bore, while the other end of the spring extends into and abuts a cup-shaped screw cap 72 mounted in the bore.

So long as the bar of stock in the chuck is of the desired diameter the parts will be in the relationship shown in Figs. 5 and 6, respectively, when in chuck open or chuck closed position, and at such times no relative movement will occur between the part 59 and the plate link 60. However, should a bar of stock of larger diameter than the desired diameter be placed in the chuck and the parts of the actuating mechanism move toward chuck closed position such larger bar of stock will prevent the parts from attaining their full chuck closed position, but should the application of force against said part continue the link 60 will swing relative to the part 59 from the full line position of Fig. 6 into the full line position of Fig. 7, with the camming surfaces of the plate link acting on the roller 70 and compressing the spring 71. This relative movement of the plate link allows the arm 61, shaft 62 and lever 63 to move into full work gripping position, but such movement does not impart any further movement or additional force to the part 59 and the actuated lever 56 in the chuck closing direction. When the parts are in the position shown in Fig. 7 the plate link 60 has engaged the plunger 64b and moved the same inwardly to compress its spring. As soon as the operator releases his hold on the handle 63 the spring pressed plunger 64b, in conjunction with the spring pressed plunger 69, will exert a force on the plate link 60 to rock the same from its full line position of Fig. 7 back to its full line position of Fig. 6, with a resultant movement of the arm 61, shaft 62 and handle 63 toward chuck open position, thus indicating to the operator that the chuck has not been properly closed so as to correctly grip the bar of stock.

Figs. 9 to 12 inclusive illustrate another form of actuating mechanism which can be used in conjunction with the collet chuck illustrated in Fig. 6. This modified form of actuating mechanism likewise includes the actuated lever 56 and a link 73 corresponding in general with the two-part link 58, 59 shown in Figs. 5 and 6. The link 73 includes a part 74 at one end thereof corresponding with the part 58 of Fig. 6 and which is pivotally connected with the lever 56. The opposite end of the lever 73 is pivotally connected with a member 75 which is freely rockable on a shaft 76 which corresponds with the shaft 62 of Fig. 6. A member 77 forming a part of the operating means is keyed to the shaft 76 and is adapted to be rocked by means of an operating lever 76a which is also keyed to the shaft and corresponds with the lever 63 of Fig. 6. The member 77 is here shown as having forked portions 78, the lower ends of which are adapted for abutting cooperation with a fixed stop rod 79 corresponding with the stop rod 65 of Fig. 6.

The freely rockable member 75 is connected with the member 77 by means of a pair of links 80 and 81, the latter of which carries a lug 82 having a cam surface 83 thereon. The adjacent ends of these links are pivotally connected by the pin 89 and their outer ends are pivotally connected with the members 75 and 77 by the pins 80a and 81a. The elements 80 and 81 thus form a yieldable connection or articulated linkage. A retaining pawl 84 is pivotally mounted in the forked portion 78 of the member 77 and cooperates with the lug 82 through a roller 85 which engages the cam portion 83. A plunger 86 is movably mounted in the member 77 and is urged by a spring 87 against the retaining pawl 84 for causing the latter to retain the links 80 and 81 in the relative position shown in Figs. 9 and 10 for the transmission of pushing and pulling forces between the members 75 and 77 during the normal operation of the mechanism. This action of the retaining pawl 84 is supplemented by or followed by the action of a pair of tension springs 88 which have their ends connected respectively with the pivot pin 89 of the links 80 and 81 and an anchor pin 90 carried by the member 77.

In the modified actuating mechanism just described above, it will be observed that Fig. 9 shows the mechanism in the chuck released position. When actuating force is applied to the shaft 76 through the lever 76a in a chuck closing direction either manually or by a suitable power device, the member 77 is swung to a chuck closed position in which this member is in engagement with the fixed stop rod as shown in Fig. 10. If the diameter of stock is such as to permit proper closing of the chuck no relative movement occurs between the members 77 and 75 and, as shown in Fig. 10, the links 80 and 81 remain in their normal operating position and the corresponding normal relative position for the link 73 is such that the parts are locked in a position corresponding with the chuck closed condition by means of a toggle action similar to that obtained in the actuating mechanisms previously described herein.

If oversize stock has been placed in the chuck and an attempt is made to close the chuck, the member 77 will be moved to its fully actuated position in engagement with the fixed stop rod 79, as shown in Fig. 12, if sufficient force has been applied but the actuated lever 56 will not be moved to a chuck closed position because of the oversize character of the stock. The link 73 will likewise be prevented from moving to its normal chuck closed position and this abnormal condition will result in a relative rocking or closing movement between the members 77 and 75 and about the axis of the shaft 76, and this relative movement causes the links 80 and 81 to be collapsed to the position shown in Fig. 12. This movement of the links 80 and 81 to their collapsed position takes place initially against the holding force of the retaining pawl 84 and subsequently against the tension of the springs 88. When the mechanism has been actuated, by the application of sufficient force, to produce the collapsed condition shown in Fig. 12 and the operator removes his hand from the operating lever or the power control member thereon, the pull of the springs 88 will restore the links 80 and 81 to their normal position shown in Fig. 9 and, in so doing, produces a rotative movement of the member 77 in a clockwise direction thereby rocking the shaft 76 and the operating lever 76a connected therewith and this return movement of the operating lever informs the operator that the chuck has not been closed.

Although several embodiments of the invention have been illustrated and described herein, it should be understood that the invention is susceptible of various modifications and adaptations within the scope of the appended claims.

Having thus described my invention, I claim:

1. In the actuating mechanism of a work gripping device having an operating part and an actuated part; an operative connection between said parts and including a pair of relatively movable elements operatively connected respectively with said parts, means interconnecting said elements and spring means operatively associated with said elements and resisting, with a predetermined force, relative movement therebetween during the actuation of the device in the work gripping direction and adapted to be stressed when said force is exceeded, whereupon relative movement occurs between said elements and said spring acts through said elements to move said operating part in the work releasing direction.

2. In the actuating mechanism of a work gripping device having an operating part including a handle and an actuated part; an operative connection between said parts and including relatively movable elements operatively connected respectively with said parts, means interconnecting said elements and spring means operatively associated with said elements and maintaining the same, with a predetermined force against relative movement and in normal operative relationship, said spring means, elements and parts being so disposed that when said force is exceeded during the operation of the mechanism in the work gripping direction, relative movement occurs between said elements, and said spring means is stressed and tends to restore said elements to their normal operative relationship and to move the operating part and the handle in the work releasing direction.

3. In the actuating mechanism of a work gripping device having an operating part and an actuated part; an operative connection between said parts and including a pair of pivotally interconnected elements pivotally connected respectively with said parts, and spring means operatively associated with said elements and maintaining the same with a predetermined force against relative movement therebetween and in normal operating relationship, said spring means, elements and parts being so disposed that when said predetermined force is exceeded during the actuation of the mechanism in the work gripping direction, relative movement occurs between said elements, and said spring means is stressed and acts to restore said elements to their normal operative relationship and to move said operating part in the work releasing direction.

4. In the actuating mechanism of a work gripping device having an operating part and an actuated part; an operative connection between said parts and including a pair of pivotally interconnected elements operatively connected respectively with said parts, and spring means arranged to exert a predetermined force against the element which is connected to the operating part and to maintain said elements in normal operative relationship and to resist relative movement therebetween, said spring means being adapted to be stressed when said force is exceeded during actuation of the mechanism in the work gripping direction, whereupon relative movement occurs between said elements, and said spring means acts to restore said elements to their normal operative relationship and to move said operating part in the work releasing direction.

5. In the actuating mechanism of a work gripping device having an operating part and an actuated part; an operative connection between said parts and including a pair of pivotally interconnected links, with said links pivotally connected respectively to said parts, and spring means resisting with a predetermined force, relative pivotal movement between said links and maintaining the same in normal operative relationship, said spring means being adapted to be stressed when said force is exceeded during the actuation of the device in the work gripping direction, whereupon relative pivotal movement occurs between said links, and said spring means acts to restore said links to normal operative relationship and to move said operating part in the work releasing direction.

6. In the actuating mechanism of a work gripping device having an operating lever including a handle and an actuated lever; an operative connection between said levers and including a pair of pivotally interconnected links which are pivotally connected respectively to said levers, and spring means operatively associated with said links and resisting, with a predetermined force, relative pivotal movement therebetween and maintaining said links in normal operative relationship, said links and said spring means being arranged that when said force is exceeded during the actuation of the mechanism in the work gripping direction, relative pivotal movement occurs between said links and said spring means is compressed and acts upon said links to restore the same to normal operative relationship and to move said operating lever and said handle in the work releasing direction.

7. In the actuating mechanism of a work gripping device having an operating lever including a handle and an actuated lever; an operative connection between said levers and including a pair of pivotally interconnected links which are pivotally connected respectively to said levers, and spring means carried by said actuated lever and acting against one of said links to resist, with a predetermined force, relative pivotal movement between said links and to maintain said links in normal operative relationship, said links and spring means being so arranged that when said force is exceeded during the actuation of the mechanism in the work gripping direction, relative pivotal movement occurs between said links and said spring means is compressed and acts to restore said links to normal operative relationship and to move said operating lever and handle in the work releasing direction.

8. In the actuating mechanism of a work gripping device having an operating lever including a handle and an actuated lever; an operative connection between said levers and including a pair of pivotally interconnected links which are pivotally connected respectively to said levers, and spring means carried by said actuated lever and acting, with a predetermined force, against the link which is connected to said operating lever to resist relative movement between said links and to maintain the same in normal operative relationship, said links, levers and spring means being so disposed that when said force is exceeded during actuation of said mechanism in the work gripping direction, relative movement occurs between said links and said spring is compressed and acts to restore said links to normal operative relationship and to move said operating lever and handle in the work releasing direction.

9. In the actuating mechanism of a work gripping device having an operating lever including a handle and an actuated lever; an operative connection between said levers and including a pair of pivotally interconnected links which are pivotally connected respectively to said levers, and spring means carried by one of said links and acting against the other thereof to resist, with a predetermined force, relative pivotal movement therebetween and to maintain the same in normal operative relationship, said links, parts and spring means being so disposed that when said force is exceeded during the operation of the mechanism in the work gripping direction relative pivotal movement occurs between said links, and said spring means is compressed and acts to restore said links to normal operative relationship and to move said operating lever and handle in work releasing direction.

10. In the actuating mechanism of a work gripping device having an operating lever including a handle and an actuated lever; an operative connection between said levers and including a pair of pivotally interconnected links which are pivotally connected respectively to said levers, and spring means carried by said link which is pivotally connected to said actuated lever and acting on said link which is pivotally connected to said operating lever to resist, with a predetermined force, relative pivotal movement between said links and to maintain the same in normal operative relationship, said levers, links and spring means being so disposed that when said force is exceeded during the actuation of the mechanism in the work gripping direction, relative pivotal movement between said links occurs and said spring means is compressed and acts to restore said links to normal operative relationship and to move said operating lever and handle in the work releasing direction.

11. In the actuating mechanism of a work gripping device as defined in claim 10, supplemental spring means operatively associated with said links and acting, when relative movement occurs between said links, in conjunction with said first mentioned spring means to restore said links to normal operative relationship.

12. In a collet chuck actuating mechanism of the type having a rockable operating lever including a handle, an actuated lever and a shiftable collet actuating cone operatively connected with said actuated lever; an operative connection between said levers and including a pair of pivotally interconnected links which are pivotally connected respectively with said operating lever and said actuated lever, and spring means operatively associated with said links and exerting predetermined force thereon to resist relative movement therebetween and maintain the same in normal operative relationship, said spring means being compressed when said cone is prevented from having its normal operative movement during chuck closing actuation of the mechanism, at which time said links move relative to each other and provide for complete operative movement of said operating lever and handle while said spring acts to restore said links to normal operative relationship and to rock said operating lever and handle in the chuck releasing direction.

13. In a collet chuck actuating mechanism of the type having an operating lever including a handle, a rockable actuated lever, a slidable cone actuated by said actuated lever and provided with a conical camming surface and a cylindrical land, and rockable chuck closing fingers provided with rollers engageable by said cone and normally contacting said land when the chuck is in stock gripping engagement; an operative connection between said levers and including a pair of pivotally interconnected links which are pivotally connected respectively with said operating lever and said actuated lever, and spring means operatively associated with said links and resisting relative movement therebetween when said levers, cone and fingers can move to normal work gripping position during the actuation of the mechanism but which, when the rollers do not reach a position on the land of the cone during chuck closing actuation, said spring is compressible upon continued movement of the operating lever to allow relative movement between said links and then to restore said links to normal operating relationship and move said operating lever in the chuck opening direction.

14. In the actuating mechanism of a work gripping device, an operating lever, an actuated lever, and an operative connection between said levers, and including a link having one of its ends pivotally connected to said operating lever, said actuated lever being provided with an opening therethrough and extending longitudinally thereof, a second link pivotally connected at one of its ends to said actuated lever within said opening and having its other end pivotally connected to the other end of said first named link, said actuated lever being provided with a longitudinal bore communicating with said opening, a plunger slidable in said bore and having an operative association with said first named link, and a spring mounted in said bore and acting on said plunger to exert its force through said plunger against said link to resist relative movement between said links.

15. In the actuating mechanism of a work gripping device, an operating lever, an actuated lever, and an operative connection between said levers and including a link having one of its ends pivotally connected to said operating lever, a second link having one of its ends pivotally connected to said actuated lever and its other end pivotally connected to the other end of said first named link, spring pressed means carried by said actuated lever and acting against said first named link, said actuated lever and said second link having cooperating means limiting movement of said links in a direction to compress said spring pressed means.

16. In the actuating mechanism of a work gripping device, an operating lever, an actuated lever and an operative connection between said levers and including a relatively short link pivotally connected to said operating lever, a relatively long link pivotally connected at one end to said actuated lever and at the other end to said relatively short link, said relatively long link being provided with an elongated bore, a plunger mounted in said bore and operatively engaging said relatively short link, and a spring mounted in said bore and acting on said plunger to resist relative movement between said links.

17. An actuating mechanism of a work gripping device as defined in claim 16, and wherein said relatively short link is provided on its edge with a pair of adjacent camming surfaces and with which said plunger is operatively associated during different operating conditions of said mechanism.

18. An actuating mechanism of a work gripping device as defined in claim 14, and wherein supplemental spring means is provided which acts on said short link when said plunger is depressed against its spring, said plunger and said supplemental spring means acting to move said links to their normal operative relationship.

19. In the actuating mechanism of a work gripping device, a rockable operating member, a rockable actuated member, and an operating connection between said members comprising a pair of pivotally interconnected elements pivotally connected respectively with said members, and spring means including a tension spring, associated with said elements and maintaining the same against relative movement therebetween and in normal operating relationship, said spring means, elements and members being so disposed that when a predetermined force is exceeded during the actuation of the mechanism in the work gripping direction relative movement occurs between said elements, and said spring means acts to restore said elements to their normal operating relationship and to move said operating member in the work releasing direction.

20. In the actuating mechanism of a work gripping device, a shaft, an operating member and an actuated member associated with said shaft and adapted for relative rocking movement about the axis thereof, articulated linkage connecting said members and having a normal position for holding said members against relative rocking movement during the application of a predetermined force to said work gripping device, said linkage being yieldable to permit relative rocking movement between said members in response to the application of an abnormal force to said work gripping device, and means resisting the yielding of said linkage.

21. In the actuating mechanism of a work gripping device, a shaft, an operating member and an actuated member associated with said shaft and adapted for relative rocking movement about the axis thereof, articulated linkage connecting said members and having a normal position for holding said members against relative rocking movement during the application of a predetermined force to said work gripping device, said linkage being yieldable to permit relative rocking movement between said members in response to the application of an abnormal force to said work gripping device, means carried by one of said members and cooperating with the linkage for yieldably retaining the same in said normal position, and spring means for restoring the linkage to said normal position.

22. In actuating mechanism for a chuck, a chuck actuating lever, an operating lever movable in chuck closing and chuck opening directions and mechanism operatively connecting the chuck actuating lever with said operating lever comprising a pair of relatively rockable members connected respectively with said chuck actuating lever and said operating lever, articulacted linkage connecting said members and having a normal position for holding said members against relative rocking movement during the application of a predetermined force to said chuck actuating lever in response to movement of said operating lever in a chuck closing direction, said linkage being yieldable to permit relative rocking movement between said members upon the application of an abnormal operating force to said chuck actuating lever, and spring means resisting the yielding of the linkage and also acting to restore the linkage to its normal position and cause movement of said operating lever in a chuck opening direction.

23. In actuating mechanism for a chuck having an actuating lever, a shaft, an operating lever connected with said shaft for rocking the same, a member connected with said shaft and adapted to be rocked thereby, a second member rockable on the first mentioned member, means connecting the second member with said chuck actuating lever, articulated linkage connecting said second member with the first mentioned member and having a normal position for holding said members against relative rocking movement during the application of a predetermined operating force to said chuck actuating lever, said linkage being yieldable in response to the application of an abnormal operative force to said chuck actuating lever so as to permit relative rocking between said members, and spring means resisting the yielding of said linkage and acting to restore the linkage to said normal position.

24. In the actuating mechanism of a work gripping device having an operating part and an actuated part; a safety connection between said parts for transmitting movement of said operating part to said actuated part and comprising a pair of elements operatively connected respectively with said parts, means interconnecting said elements for relative movement therebetween, and force applying means operatively associated with said elements and acting with a predetermined force to normally maintain said elements in a predetermined relationship wherein said elements impart movement of said operating part to said actuated part, said force applying means being overcome when said predetermined force is exceeded during the actuation of the device in the work gripping direction and prior to said device attaining its final work gripping position to allow relative movement between said elements out of their normal relationship to thus terminate the movement in the work gripping direction of said actuated part by said operating part, said force applying means then acting to restore said elements to their normal relationship and to move said operating part in the work releasing direction.

25. In the actuating mechanism of a work gripping device having an operating part and an actuated part; a safety connection between said parts for transmitting movement of said operating part to said actuated part and comprising a pair of elements operatively connected respectively with said parts, means interconnecting said elements for relative movement therebetween, and spring means operatively associated with said elements and acting with a predetermined force to normally maintain said elements in a predetermined relationship wherein said elements impart movement of said operating part to said actuated part, said spring means being overcome when said predetermined force is exceeded during the actuation of the device in the work gripping directions and prior to said device attaining its final work gripping position to allow relative movement between said elements out of their normal relationship to thus terminate the movement in the work gripping direction of said actuated part by said operating part, said spring means then acting to restore said elements to their normal relationship and to move said operating part in the work releasing direction.

FRED H. BOGART.

REFERENCES CITED

The following references are of record in the file of this patent:

UNITED STATES PATENTS

| Number | Name | Date |
|---|---|---|
| 1,261,757 | Brophy | Apr. 9, 1918 |